June 7, 1960  F. W. BOOTH  2,939,311
LIQUID AEROSOL INDICATOR
Filed Oct. 31, 1956
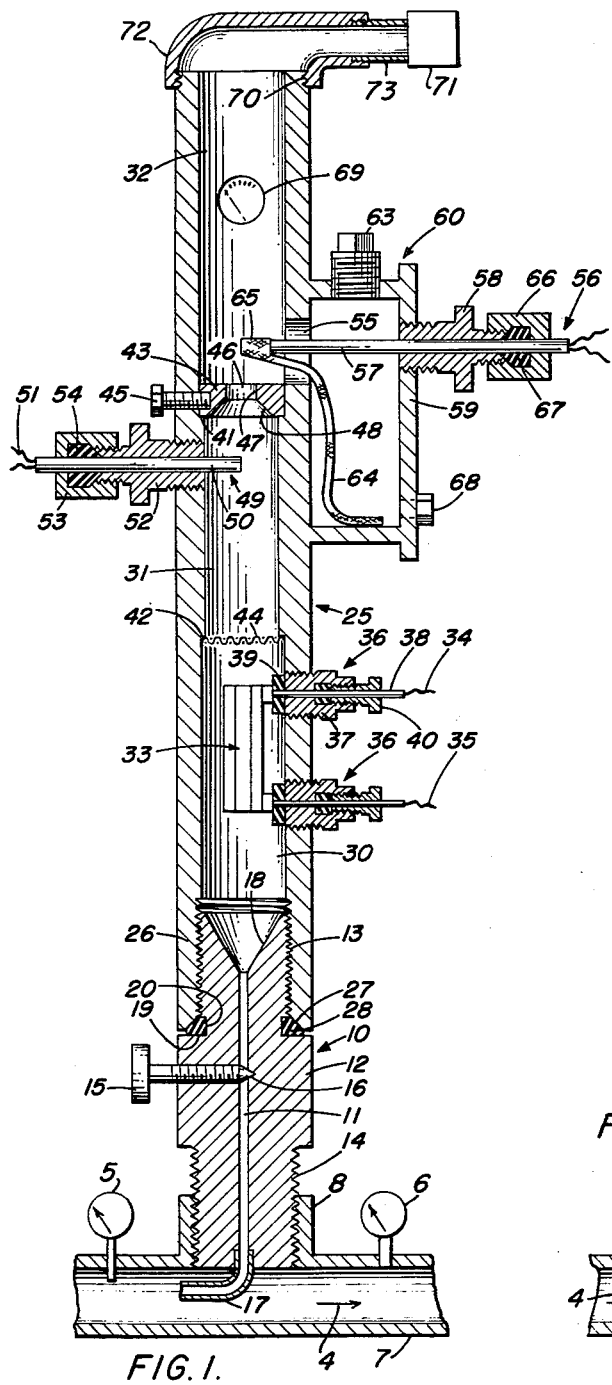
FIG. I.
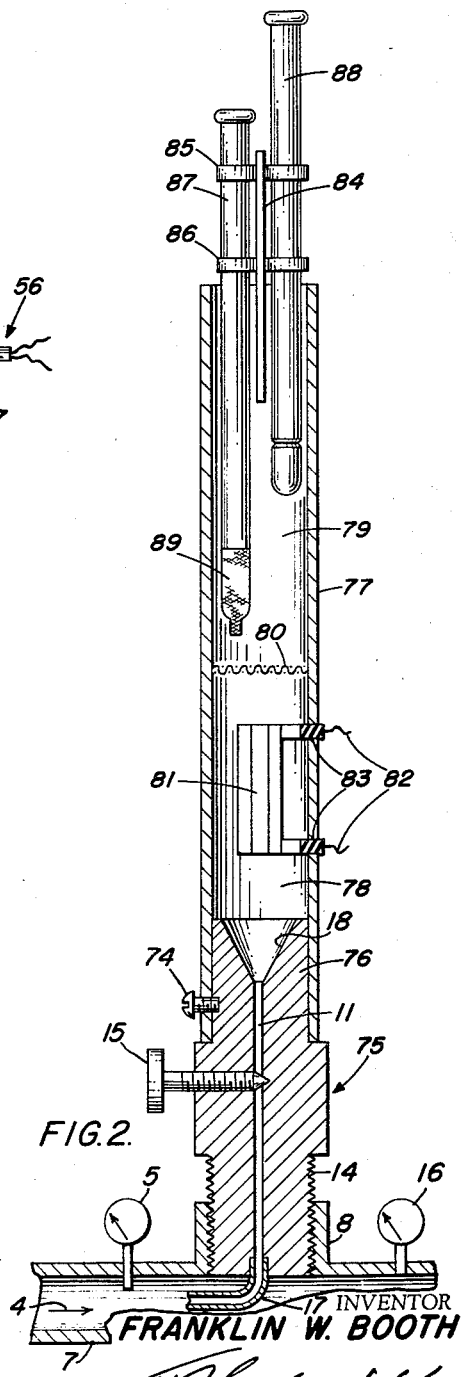
FIG. 2.
INVENTOR
FRANKLIN W. BOOTH
BY
ATTORNEYS United States Patent Office 2,939,311
Patented June 7, 1960

2,939,311

LIQUID AEROSOL INDICATOR

Franklin W. Booth, 217 Regent St., Hampton, Va.

Filed Oct. 31, 1956, Ser. No. 619,646

6 Claims. (Cl. 73—29)

(Granted under Title 35, U.S. Code (1952), sec. 266)

The invention described herein may be manufactured and used by or for the Government of the United States of America for governmental purposes without the payment of any royalties thereon or therefor.

This invention relates to apparatus for continuous or intermittent measurement of a suspension of liquid particles in a gas, usually known as liquid aerosols, particularly aerosols in a condition of supersaturation in a gas stream at gas pressures varying from sub-atmospheric to super-atmospheric pressures.

In many manufacturing processes it has become important to determine the mass of liquid in aerosols which are subject to varying pressures, such as water vapor in air upstream and downstream of liquid moisture separators or in air entering silicagel or activated alumina air dryers.

It is, accordingly, an important object of the invention to provide apparatus for mass measurement of liquid aerosols streams at widely varying pressures. An object, also, is to provide an apparatus for liquid aerosol mass measurement which is operable at super-atmospheric pressures. Objects of the invention pertain, also, to provision of apparatus of the described type which is simple in construction and may be of small size and be readily manipulated for quantitative determinations.

Other objects and many of the attendant advantages of this invention will be readily appreciated as the same becomes better understood by reference to the following detailed description when considered in connection with the accompanying drawings wherein:

Fig. 1 is a vertical sectional view showing the various elements of the apparatus; and Fig. 2 is a similar view of a modified form of the apparatus usable only at super atmospheric pressures.

The apparatus, as shown in Fig. 1, includes a metal screw fitting 10 having a central duct 11 therethrough, the fitting having a central section 12 and externally threaded ends 13 and 14. A screw valve 15 is threaded in a threaded recess in central section 12, the valve having a pointed end 16 adapted, on valve rotation, to adjust the flow of fluid through duct 11 from zero to full value. The threaded end 14 of fitting 10 is attachable to the fitting 8 connected to gas pipe 7, the mass content of the contained gas in which, is to be determined. A thermometer 5 and pressure gauge 6 are connected to the pipe 7 to obtain the temperature and pressure of the gas flowing in the pipe. A Pitot type tube 17 is inserted at the end of duct 11 at screw end 14 to facilitate gas flow into the duct. Screw end 13 of fitting 12 is internally hollowed to form a conical extension 18 of duct 11, permitting uniform expansion of the gas flow from the duct 11 to the approximate diameter of the screw end 13.

Section 12 of fitting 10 has a diameter somewhat larger than the screw end 13 so that a shoulder 19 is formed between these parts; and this shoulder is increased in width by an annular groove 20 cut at the base of the thread 13. A hollow metal expansion tube 25, having one end 26 internally threaded, is attached to the fitting thread 13, the inner edge of tube end 26 being sharply tapered, as at 27, so that, when the tube 25 is screwed into place, the edge 27 engages and compresses a sealing gasket 28, thereby insuring a tight gas fit between these parts.

The tube 25 forms an expansion chamber which is divided internally into three separate but connecting cells or compartments, namely, a heating cell 30 adjacent the attaching end 13 of fitting 10, a dry thermometer cell 31, and a wet thermometer cell 32, these cells being connected in sequence. The terms "wet" and "dry" are used instead of "wet bulb" and "dry bulb" in describing the thermometers since they are of the electrical thermocouple type. The cell 30 contains an electric heating element 33 which may be in the form of an open ended tube containing a bare electrical conductor connected at its ends to lead-out wires 34 and 35. Each lead-out wire is supported by a terminal member 36 consisting of a metal screw plug 37 having a central bore adapted to receive the wire tube 38, the plug being screw-threaded in an opening in the wall of tube 25. The tube 38 protrudes beyond the plug ends, on the inner end the tube being surrounded by a sealing washer 39, and on the outer end carrying a screw element 40 adapted to prevent gas leakage around tube 38.

The dry thermometer cell 31 has a diameter slightly smaller than the heater cell 30 and the wet thermometer 32 cell. This permits formation of ledges 41 and 42 at the ends of the dry thermometer cell 31, the ledge 41 serving to support the nozzle 43 and the ledge 42 supporting screen 44. Nozzle 43 is in the form of an apertured disk held in position by set screw 45, the aperture 46 for half its length from the wet thermometer cell side being cylindrical and of reduced diameter, as at 47, and the other half 48 being flared outwardly to form a converging conical surface for fluid flow. The screen 44 is fixed at its edges, by any suitable means, to the ledge 42.

Penetrating the wall of cell 31 is the dry thermometer 49, that is a thermometer indicating the actual gas temperature within the expansion chamber. This thermometer is shown as of the electrical type, including a thermocouple positioned at the inner end of and supported by a tube 50, the wire terminals being indicated at 51. Tube 49 is press fitted within screw plug 52 and extends beyond the outer plug surface where it is adapted to receive a sealing nut 53 screw fitted to the plug for compression of sealing gasket 54.

In the wet thermometer cell 32 an opening 55 is made in the wall for insertion of the wet thermometer 56 at a point spaced sufficiently from the dry thermometer to prevent inaccurate readings of both instruments. This thermometer is of the thermocouple type, as at 49, and includes the thermocouple tube 57 which is supported, with its thermocouple end penetrating opening 55, by a screw plug 58 fitted in the outer wall 59 of a box-like casing 60 surrounding, and displaced from the expansion tube wall opening 55 and attached to, or preferably integral with, tube 25. The casing 60 serves when the apparatus is in upright position, as shown in Fig. 1, as a receptacle for wetting liquid for the thermometer, a removable plug 63 being provided on the top side for liquid supply. As is usual in thermometers of this type, a wick 64 is used which may be of any fabric having adequate capillary properties, one end 65 of the wick enclosing the thermocouple end of tube 57 and the other end extending along the base of liquid receptacle 60.

Thermocouple tube 57 extends outwardly from plug 58 and is sealed in the plug by a sealing nut 66 having screw threaded engagement with the plug end and enclosing a sealing gasket 67, the gasket being compressed by rotation of the sealing nut.

A port is provided in wall 59 of casing 60 for injection of volatile liquids, such as Freon, when measurement of these liquids is to be made, this opening being normally closed by screw head 68. A pressure gauge 69 is attached to tube 25 at the section 32, this gauge giving the expansion chamber pressure and facilitating calculation of the expansion ratio of the aerosol across the valve 15. The outer end of tube 25 is externally threaded as at 70 for connection to a reduced pressure point, which may be the suction point of a compression stage in the system, as indicated at 71, the connection being through coupling 72 and pipe 73. In this manner, the pressure and density of aerosol flow may be varied.

The operation of the apparatus is as follows. Assuming threaded end 14 of the fitting 10 is coupled to the source of gas super-saturated with liquid aerosols to be measured and threaded end 70 coupled to a point of pressure reduced over values prevalent in the apparatus, and assuming also that the source pressure of the gas is super-atmospheric, valve 15 is manipulated to permit a sample flow of aerosol into cell 30. Here the gas is expanded and cools as a result thereof. Heater 33 then heats the expanded gas to the original intake temperature, and also vaporizes the aerosols suspended therewithin; the re-heated gas being less than saturated with vaporized aerosols. The gas, now restored to the original temperature, is then drawn through the screen 44, which serves as a mixer to secure uniform particle dispersion, and passes the dry thermometer in cell 31 which indicates the dry temperature. The nozzle 43, which is replaceable to secure different flow apertures, assists, by its constricting action, in controlling the gas expansion in chambers 30 and 31 and develops a velocity and direction of particle impingement on the wet thermometer wick in cell 32 of such value as to obtain accurate readings, the drop in temperature due to evaporation, as registered by the wet thermometer 56, giving the required wet-dry differential for calculation of the relative humidity of the gas in the usual way by use of standard tables. Given the relative humidity, the mass in grains per cubic foot may be obtained from published data, and this value is multiplied by the expansion ratio across inlet valve 15 to obtain the grains per cubic foot in the original gas stream. From this value, the grains necessary to saturate the gas is subtracted, giving the required aerosol gas content. Where determination of mass flow is made for a volatile substance such as Freon, the liquid Freon is injected into casing 60 through the basal port with the pressure, as indicated by gauge 69, being in excess of the condensation pressure of the volatile liquid, the aerosol gas and vapor from the test source passing through the expansion tube 25 where it is subject to heating and dry and wet temperature measurement.

Where super-atmospheric pressures only are involved in the use of the apparatus, the modified form of apparatus shown in Fig. 2 may be used. In this modification, the fitting 75 is similar to fitting 10 of Fig. 1 except, by elimination of the gas leakage problem, the fitting end 76 corresponding to screw end 13 of Fig. 1 is smooth-sided and press-fitted into the tube 77, where it is held by a set-screw 74. Parts in this modification which are identical in form and function to the parts of Fig. 1 are indicated by similar numbering.

The tube 77 is of fibre and is divided into two cells 78 and 79 by mixer screen 80, and an electric heater 81 is provided in cell 78 which is similar to heater 33, with the exception of the wire terminal lead-in arrangement where, since no inflow gas leakage is involved, the terminal wires 82 are merely passed through electric insulation blocks 83 in the tube wall.

Tube cell 79 is open-ended and includes both wet and dry bulb thermometers which are shown as of the liquid type. A thermometer board support 84 is mounted vertically on the tube 79 to protrude from the open end thereof, and to this board are attached the elastic thermometer clip units 85 and 86. These clips support the wet thermometer 87 and the dry thermometer 88, dry thermometer 88 being mounted at a higher level than wet thermometer 87 to avoid the cooling effect of the wet bulb of thermometer 87 produced by the moistened fabric 89.

The operation of the modified apparatus of Fig. 2 is similar to that of the Fig. 1 apparatus. In both arrangements it is apparent that for gases super-saturated with liquid aerosols at super-atmospheric pressures quantitative measurements of the liquid particle density may be readily made. Where high pressures or sub-atmospheric pressures in the expansion chamber are involved, use of the apparatus of Fig. 1 is indicated. A detailed example of the procedure of aerosol determination may aid in the understanding of the apparatus hereinabove described, following the Fig. 2 modification. Assume a gas flow in pipe 7, the aerosol content of which is to be determined, the direction of flow being indicated by the arrow 4. Assume, also, a gas temperature of 100° and pressure of 147.0 pounds per square inch absolute in pipe 7, and an expansion in tube 77 through expansion duct 11 reducing the pressure to 14.7 pounds per square inch absolute. After heating by heater 81 to restore the gas temperature to 100° F., readings on the wet and dry bulb thermometers 87 and 88 show values of 83½° F. and 100° F. respectively. From a psychrometric chart, a dry bulb reading 100° F. will indicate a relative humidity of 50 percent. From published data it will be found that one cubic foot 100° F. air will contain 19.95 grains of water when fully saturated. Consequently, at 50 percent relative humidity one cubic foot of air contains 9.975 grains of moisture.

Using the known fact that the quantity of water absorbed by one cubic foot of air for saturated conditions is completely independent of pressure, then it is apparent that the source gas sample contains water in the quantity of 9.975 (grains of water in the expanded unit) times the compression ratio between 14.7 and 147.0 or 99.75 grains per cubic foot. To obtain the aerosol content, 19.975 (grains per cubic foot fully saturated) is subtracted from the total grain content of 99.75, giving a value of 79.80 grains per cubic foot of liquid aerosol in the original air stream.

Obviously many modifications and variations of the present invention are possible in the light of the above teachings. It is therefore to be understood that within the scope of the appended claims the invention may be practiced otherwise than as specifically described.

What is claimed is:

1. Apparatus for determination of the mass content of liquid aerosols comprising an elongated tubular expansion chamber, a source of compressed gas super-saturated with liquid aerosols, a tubular duct connecting said source to said chamber, an adjustable valve inserted in said duct for regulating the supply of compressed gas to said chamber, the diameter of a portion of said duct extending from said source toward said chamber being a small fraction of the diameter of said chamber, a length of said duct adjacent said chamber being longitudinally aligned therewith and linearly varying in diameter from the diameter of said portion of said duct to the diameter of said chamber for diffusing said compressed gas into said chamber, said length of said duct forming an end wall of said chamber, said chamber containing a heating cell adjacent said duct, means for heating said cell and thereby vaporising the aerosols suspended within said diffused gas, the resulting gas being less than saturated with said vapor, and wet and dry thermometers mounted in said chamber.

2. The apparatus as defined in claim 1, said chamber containing a thermometer cell positioned adjacent said heating cell and downstream thereof, and a mixing screen interposed between said heating and thermometer cells for securing uniform vapor particle dispersion.

3. The apparatus as defined in claim 1 with said wet thermometer mounted on the down stream side of said dry thermometer, and a nozzle positioned between said thermometers and secured to the wall of said chamber for accelerating and directing aerosol flow by said wet thermometer and for aiding in controlling the expansion of the source gas in said chamber.

4. The apparatus as defined in claim 3, with said nozzle being in the form of a plate placed across said thermometer chamber and having an orifice therethrough, the upstream section of said orifice having a downstream converging wall and the downstream section of said orifice being cylindrical.

5. The apparatus as defined in claim 1 and suction means attached to the downstream end of said expansion chamber for controlling the density of said diffused aerosol.

6. The apparatus as defined in claim 5, and pressure indicating means for indicating aerosol pressures in said chamber.

References Cited in the file of this patent

UNITED STATES PATENTS

| | | |
|---|---|---|
| 1,601,243 | Irwin | Sept. 28, 1926 |
| 1,620,864 | Benesh | Mar. 15, 1927 |
| 1,894,172 | Guthrie et al. | Jan. 10, 1933 |
| 2,264,966 | Burdick | Dec. 2, 1941 |
| 2,509,889 | Shockley | May 30, 1950 |
| 2,629,253 | Deaton | Feb. 24, 1953 |

FOREIGN PATENTS

| | | |
|---|---|---|
| 908,947 | France | Nov. 12, 1945 |